United States Patent [19]

Moner et al.

[11] Patent Number: 6,065,779
[45] Date of Patent: May 23, 2000

[54] CLIP FOR RELEASABLE PUSH-TO-CONNECT TUBE FITTINGS

[75] Inventors: Ronald A. Moner, Twinsburg; Jerry L. Meeks, Macedonia, both of Ohio

[73] Assignee: Parker-Hannifin Corporation, Cleveland, Ohio

[21] Appl. No.: 09/046,209

[22] Filed: Mar. 23, 1998

Related U.S. Application Data

[60] Provisional application No. 60/055,270, Aug. 13, 1997.

[51] Int. Cl.[7] ............................. F16L 37/092; F16L 37/08
[52] U.S. Cl. ............................. 285/23; 285/81; 285/39; 285/308; 285/322; 285/323; 285/38
[58] Field of Search ............................ 285/23, 39, 81, 285/308, 322, 323, 307, 38

[56] References Cited

U.S. PATENT DOCUMENTS

| | | | |
|---|---|---|---|
| 1,587,079 | 6/1926 | Machino | 285/39 |
| 3,653,689 | 4/1972 | Sapy et al. | 285/308 |
| 3,909,046 | 9/1975 | Legris | 285/308 |
| 4,005,883 | 2/1977 | Guest . | |
| 4,009,896 | 3/1977 | Brewer . | |
| 4,059,295 | 11/1977 | Helm . | |
| 4,111,575 | 9/1978 | Hoshimo . | |
| 4,178,023 | 12/1979 | Guest . | |
| 4,302,036 | 11/1981 | Burge . | |
| 4,305,606 | 12/1981 | Legris | 285/81 |
| 4,335,908 | 6/1982 | Burge . | |
| 4,573,716 | 3/1986 | Guest . | |
| 4,606,783 | 8/1986 | Guest . | |
| 4,637,636 | 1/1987 | Guest . | |
| 4,645,246 | 2/1987 | Guest . | |
| 4,650,529 | 3/1987 | Guest . | |
| 4,722,560 | 2/1988 | Guest . | |
| 4,770,445 | 9/1988 | Steer et al. . | |
| 4,793,637 | 12/1988 | Laipply et al. | 285/39 |
| 4,804,213 | 2/1989 | Guest . | |
| 4,872,710 | 10/1989 | Konecny et al. | 285/81 |
| 4,884,829 | 12/1989 | Funk et al. . | |
| 4,923,220 | 5/1990 | Guest et al. . | |
| 4,946,213 | 8/1990 | Guest . | |

(List continued on next page.)

FOREIGN PATENT DOCUMENTS

| | | | |
|---|---|---|---|
| 226553 | 6/1987 | European Pat. Off. | 285/308 |
| 558844 | 9/1993 | European Pat. Off. | 285/323 |
| 2413750 | 11/1974 | Germany | 285/323 |
| 4002057 | 2/1991 | Germany | 285/323 |
| 234686 | 9/1989 | Japan | 285/308 |
| 406074382 | 3/1994 | Japan | 285/81 |
| 1602077 | 11/1981 | United Kingdom . | |
| 2 301 158 | 2/1999 | United Kingdom . | |

*Primary Examiner*—Eric K. Nicholson
*Attorney, Agent, or Firm*—John A. Molnar, Jr.

[57] ABSTRACT

A clip for use in combination with a fitting of a variety adapted for a releasable connection with the distal end of a length of tubing as including a body member, and an annular collet member received within a gland of the body member for slidable axial movement intermediate a rearward position accommodating the radial outward expansion of the collet member for the insertion and removal of the tubing end therethrough and a forward position effecting the radially inward contraction of the collet member about the outer tubing diameter delimiting the removal of the tubing distal end from the fitting. The clip includes a retaining portion configured to be received coaxially on the collet member intermediate an external forward end thereof and an opposing end of the fitting body member, and a shroud portion configured to extend over the forward end of the collet member for delimiting force-transmitting contact therewith tending to move the collet member from its forward to rearward position. The shroud portion is circumscribed about at least part of the outer periphery of the clip as extending axially from a forward surface of the retaining portion to a distal end defining a length of the shroud. Such length is selected so that when the retaining portion of the clip is received on the collet member, the distal end of the shroud portion terminates beyond the forward end of the collet member when the collet member is disposed in its forward position.

20 Claims, 3 Drawing Sheets

U.S. PATENT DOCUMENTS

| | | |
|---|---|---|
| 5,024,468 | 6/1991 | Burge . |
| 5,046,763 | 9/1991 | Martucci et al. . |
| 5,171,045 | 12/1992 | Pasbrig ................................. 285/322 |
| 5,230,539 | 7/1993 | Olson . |
| 5,303,963 | 4/1994 | McNaughton et al. . |
| 5,314,216 | 5/1994 | Umezawa . |
| 5,330,235 | 7/1994 | Wagner et al. . |
| 5,370,423 | 12/1994 | Guest . |
| 5,401,064 | 3/1995 | Guest . |
| 5,437,483 | 8/1995 | Umexawa . |
| 5,439,258 | 8/1995 | Yates . |
| 5,443,289 | 8/1995 | Guest . |
| 5,468,027 | 11/1995 | Guest . |
| 5,511,830 | 4/1996 | Olson et al. . |
| 5,553,895 | 9/1996 | Karl et al. ................................. 285/39 |
| 5,584,513 | 12/1996 | Sweeny et al. . |
| 5,607,193 | 3/1997 | Guest . |

CLIP FOR RELEASABLE PUSH-TO-CONNECT TUBE FITTINGS

RELATED CASES

The present application claims priority to U.S. Provisional Application Ser. No. 60/055,270, filed Aug. 13, 1997.

BACKGROUND OF THE INVENTION

The present invention relates generally to a clip for releasable, push-to-connect fittings for tubing, and more particularly to such a clip having a shroud portion for controlling the release of the tubing end from the fitting.

Tube fittings of a manual "push-to-connect" type are widely employed in a variety of pneumatic, hydraulic, and other fluid transport applications utilizing plastic or metal tubing. Also known as "push-in" or "quick-release" fittings, these fittings have been adapted for use as connectors with many different tubing types including polyurethane (PU), polytetrafluoroethylene (PTFE), fluorinate ethylene polypropylene (FEP), perfluoroalkoxy resin (PFA), polyethylene (PE), polypropylene (PP), rigid and flexible nylon, acrylonitrile-butadiene-styrene (ABS) copolymer, copper, and brass. Typical applications include commercial and residential water filtration and purification, such as in carbon or filament-based water filtration canisters or in reverse osmosis systems, water softening, beverage distribution, as well as industrial pneumatics and chemical processing.

In basic construction, these fittings, which may be configured as couplings, connectors, unions, adapters, tees, elbows, or caps, involve a generally annular body having throughbore which extends between a forward, open first end and, typically, a rearward, threaded second end. An expandable collet is slidably received within a gland of the open end of the body as extending between an external forward end and an internal rearward end which is formed of a plurality of circumferential, arcuate sections. Each of these resilient segments extends between a forward proximal end and a rearward distal end formed as having a radially outwardly facing shoulder of an enlarged outer diameter and a wedge-shaped, radially inwardly facing grip edge. These grip edges, in turn, are formed by the intersection of a forward and a rearward presenting inclined surface, the forward surface functioning as a camming surface effecting the radial outward expansion of the collet sections allowing for the insertion of a distal tubing end pushed through the collet from the open forward end of the body. A rearwardly-inclined ramp surface typically is operatively associated with the collet shoulders as integrally-formed within the internal surface of the body throughbore or gland at a position forward of the collet segment distal ends, or as separately provided as formed within the internal surface of a retaining ring interposed between the outer circumferential surface of the collet and the inner circumferential surface of the open forward end of the body. An o-ring or other seal member may be interposed between the rearward end of the collet and a forwardly presenting end wall of the body gland for effecting a fluid-tight engagement with the outer wall of the tubing and the inner wall of the body.

For assembly, as the tubing is inserted into the fitting, the distal end of the tubing first is passed through the grip edges of the collet, the segments of which expand to resiliently capture and hold the outer diameter of the tubing, and then through the o-ring which provides a leak-proof seal against the tubing outer wall. The advancement of the tubing into the open end of the fitting is continued until positively stopped by the forwardly presenting end wall of the body gland. Upon the pressurization of the tubing, or as the tubing is pulled or otherwise placed in tension by a generally forwardly directed axial force, the collet is moved slidably forwardly with the tubing. This movement is delimited, however, by the shoulders of the collet sections being made to abuttingly contact the ramp surface of the body in an force transmitting engagement applying a radially-inwardly directed force to the collet segments and the grip edges thereof. In this way, the grip of the collet thereby is energized to compressively tighten about the outer wall of the tubing preventing the removal of the tubing from the fitting.

For disassembly, the tubing may be released from the fitting by manually repositioning and holding the collet at its rearward-most axial position, typically with the forward end of the collet being abutted against the first end of the body. In such position, the collet segments are de-energized and again may be expanded to release the tubing. In this regard, the external rearward end of the collet may be configured as an annular collar which may pushed axially inwardly for advancing the collet and tubing within the body. The measure between the rearward-most and the forward-most position of the collet is known the art as the "collet rise" or "travel," and is the linear distance which the collet moves relative to the body. Generally, it is preferred to minimize this distance as extended collet travel increases the space necessary to install the fitting and otherwise is known to increase the potential for collet damage.

Representative push-in fittings of the type herein involved are described in U.S. Pat. Nos. 3,653,689; 3,999,783; 4,005,883; 4,009,896; 4,059,295; 4,111,575; 4,178,023; 4,302,036; 4,335,908; 4,573,716; 4,600,223; 4,606,783; 4,637,636; 4,645,246; 4,650,529; 4,657,286; 4,722,560; 4,770,445; 4,804,213; 4,884,829; 4,923,220; 4,946,213; 5,046,763; 5,230,539; 5,303,963; 5,314,216; 5,330,235; 5,370,423; 5,401,064; 5,437,483; 5,439,258; 5,443,289; 5,468,027; 5,511,830; 5,607,193; 5,024,468; and in UK Patent No. 1,602,077. Commercial fittings of such type are marketed by: John Guest, Berkshire, U.K.; Mazzer Industries, Rochester, N.Y., under the name "Insta-Brass™;" Norgren of Lichfield Staffordshire, England, under the name "Pneufits™;" Alkon of Diadema, Brazil; Imperial Eastman of Chicago, Ill., under the name "OmegaFlo™;" Camozzi, Brescia, Italy; Weatherhead, Toledo, Ohio, under the name "Push-Connect™;" Legris Industries, Rennes, France, under the name "LF 3000™;" SMC Pneumatics Inc., Indianapolis, Ind., under the name "One Touch;" Brass Products Division of Parker-Hannifin Corp., Otsego, Mich., under the name "Prestomatic™," which fitting is further described in the commonly-assigned co-pending application U.S. Ser. No. 08/656,743, filed Jun. 3, 1996; and Parflex Division of Parker-Hannifin Corp., Ravenna, Ohio, under the name "Tru-Seal™," which fitting is further described in U.S. Pat. No. 5,584,513.

Another fitting of the push-in type includes a grab ring formed of a plurality of resilient fingers for gripping the tubing, and a release sleeve which is slidably interposable between the fingers and the tubing outer wall for releasing the tubing from the fitting. Push-in fittings exemplary of this design include those marketed by the Brass Products Division of Parker-Hannifin Corp. under the name Prestolok, by Nycoil of Fanwood, N.J., under the name "Polymatic®," and by Pisco Products of Okaya City, Japan.

To control the disconnection of the tubing, a spring-type locking clip conventionally is employed. One such clip, shown in commonly-assigned U.S. Pat. No. 5,584,513, is of a resiliently expandable "horseshoe" or "omega" shape configured to be received over the collet as interposed between the external forward end thereof and the corresponding end of the fitting body. Typically, theses clips are designed to be "wedged" between the collet and the fitting body such that the collet is urged to its energized, forward-most position. Similarly functioning locking clips are shown in U.S. Pat. Nos. 4,005,883; 4,009,896; 4,059,295; 4,884,829; 5,330,235; and 5,437,483.

Alternatively, locking covers are provided to prevent the collet from being accidentally or otherwise unintentionally moved to is rearward-most, de-energized position. As is shown, for example, in U.S. Pat. No. 4,573,716, such caps include cylindrical side walls that extend over the collet into a mechanical or other engagement with the fitting body, and an end wall having a central aperture through which tubing is allowed to pass. Other representative covers of like construction are shown in U.S. Pat. Nos. 4,573,716; 4,923,220; 5,046,763; and 5,468,027, and in UK Patent No. 1,602,077.

As facilitating the assembly of fluid systems and obviating the need for tools or special skills to effect the tubing connections, the fittings of the above-described push-in types have represented an important advancement in the field of fluid connectors. However, as the applications for these fittings continues to grow, the concern for safety remains. Indeed, in certain applications, such as residential and commercial water purification, softening, and filtration systems, the use of these fittings is subject to compliance with industry standards and governmental regulations. It therefore will be appreciated that improvements in releasable, push-in tube fittings, and particularly in controlling the release of the tubing therefrom, would be well-received by industry.

SUMMARY OF THE INVENTION

The present invention is directed to a clip for releasable, push-to-connect tube fittings of a variety that employs an expandable collet to retain the tubing within the fitting body. In accordance with the present invention, such clip is provided as having a retaining portion defining a pair of radially expandable legs configured to be interference fit or otherwise received over the collet intermediate the external forward end thereof and the corresponding end of the fitting body. A shroud portion additionally is provided to extend axially from the retaining portion to a terminus disposed beyond the forward extent of the collet. The shroud portion covers the external forward end of the collet to prevent manual or other contact having a tendency to moving the collet to its de-energized, rearward position. In this way, the release of the tubing from the fitting body thereby is controlled.

The clip of the present invention advantageously assures for the reliability of the fitting connection without having to energize the collet, and without the need to provide a different clip size for each different type of tubing material. In this regard, it has been observed with respect to the locking clips heretofore known in the art that the dimensional tolerances of the clip, collet and tubing diameters must be strictly controlled to ensure that the necessary collet rise is achieved for the proper energization of the collet. As the clip of the present invention covers rather than energizes the collet, greater flexibility in those tolerances may be afforded.

Moreover, it is known that the physical properties of the material of construction of the tubing can influence the functioning of the clip. In particular, the material hardness and compressive strength may dictate varying degrees of collet travel to achieve the proper gripping force. For example, even assuming constant collet, fitting body, and tubing diameters, the collet rise which may be considered optimal for maximum tube holding force nonetheless will vary for different tubing materials. As tube fittings of the type herein involved are use with tubing of many different types, a differently dimensioned locking clip heretofore might be specified not only for each different tubing size, but also for each different type of tubing material. With respect to the clip of the present invention, however, only one clip size need be provided for each different tubing size regardless of the material of construction of the tubing.

As an additional advantage, the clip of the present invention is seen as providing a more robust engagement with the fitting assembly as compared to the covers heretofore known in the art. That is, similar to a cover, the clip of the invention advantageously protects the collet from unintentional contact. However, in being interference fit or otherwise received over the collet intermediate the forward end thereof and the adjacent end of the fitting, the clip itself is protected from contact which could dislodge it from the fitting.

It therefore is a feature of the present invention to provide a clip for use in combination with a fitting of a variety adapted for a releasable connection with the distal end of a length of tubing as including a body member, and an annular collet member. In such fitting variety, the collet member is received within a gland of the body member for slidable axial movement intermediate a rearward position accommodating the radial outward expansion of the collet member for the insertion and removal of the tubing end therethrough and a forward position effecting the radially inward contraction of the collet member about the outer tubing diameter delimiting the removal of the tubing distal end from the fitting. The clip includes a retaining portion configured to be received coaxially on the collet member intermediate an external forward end thereof and an opposing end of the body member of the fitting, and a shroud portion configured to extend over the forward end of the collet member for delimiting force-transmitting contact therewith tending to move the collet member from its forward to rearward position. The shroud portion is circumscribed about at least part of the outer periphery of the clip as extending axially from a forward surface of the retaining portion to a distal end defining a length of the shroud. Such length is selected so that when the retaining portion of the clip is received on the collet member, the distal end of the shroud portion terminates beyond the forward end of the collet member when the collet member is disposed in its forward position.

It is a further feature of the invention to provide a fitting assembly of a variety adapted for a releasable connection with a distal tubing end. The assembly includes a body member, an annular collet member, and a clip. The collet member is received within a gland of the body member for slidable axial movement intermediate a rearward position accommodating the radial outward expansion of the collet member for the insertion and removal of the tubing end therethrough and a forward position effecting the radially inward contraction of the collet member about the outer tubing diameter delimiting the removal of the tubing distal end from the fitting. The clip includes a retaining portion received coaxially on the collet member intermediate an external forward end thereof and an opposing end of the body member of the fitting, and a shroud portion which extends over the forward end of the collet member for delimiting force-transmitting contact therewith tending to move the collet member from its forward to rearward position. The shroud portion is circumscribed about at least part of the outer periphery of the clip as extending axially from a forward surface of the retaining portion to a distal end defining a length of the shroud. Such length is selected so that the distal end of the shroud portion terminates beyond the forward end of the collet member when the collet member is disposed in its forward position.

Advantages of the present invention include a clip construction which provides robust fitting protection from accidental or otherwise unintentional disconnections, and which may be adapted for use with a variety of tubing materials. Additional advantages include a clip construction which is economical to manufacture, and which provides for disconnection protection while obviating the need to energize the collet. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

These drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward" and "rearward" designate directions in the drawings to which reference is made, with the terms "radial" and "axial" referring, respectively, to directions perpendicular and parallel to the longitudinal central axis of the referenced element. Terminology of similar import other than the words specifically mentioned above likewise is to be considered as being used for purposes of convenience rather than in any limiting sense.

For the purposes of the discourse to follow, the precepts of the invention herein involved are described in connection with a push-in tube fitting assembly as may be used in a variety of fluid transfer applications, including water filtration, chemical processing, and pneumatic systems, involving plastic or metal tubing having an outer diameter of from about ¼-inch (6 mm) to ½-inch (13 mm). It will be appreciated, however, that aspects of the present invention may find utility in other fluid applications, whether for gases or liquids, which utilize fittings and tubing of such type. Use within those such other applications therefore should be considered to be expressly within the scope of the present invention.

Figure 1:
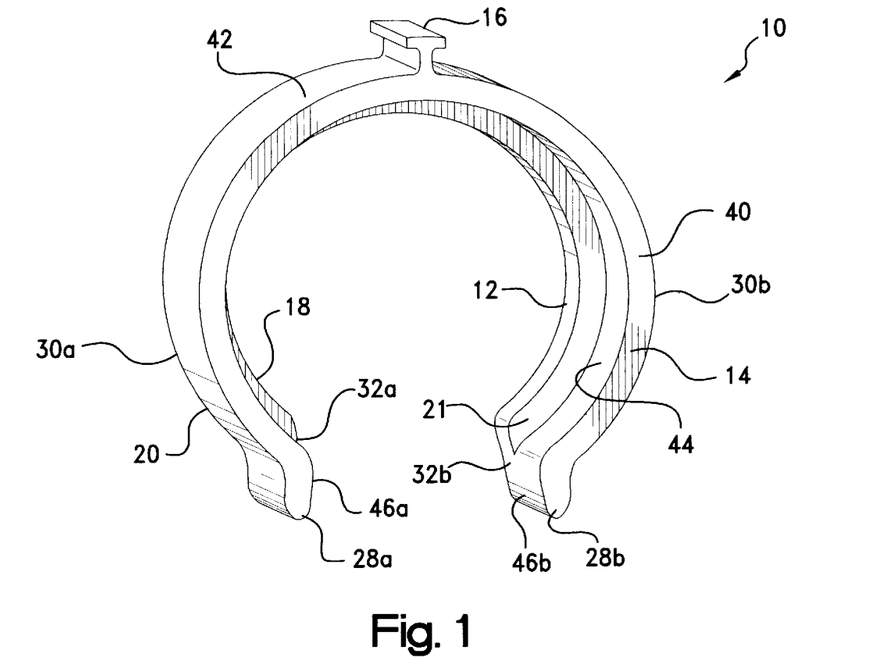
FIG. 1 is a perspective view of a shrouded clip in accordance with the present invention.

Referring then to the figures, wherein corresponding reference characters are used to designate corresponding elements throughout the several views, shown generally at 10 in the perspective view of FIG. 1 is an embodiment of a clip according to the present invention. Such clip is particularly adapted for use in combination with push-to-connect tube fittings of a variety which employs an annular collet received for slidable movement within an internal gland of at least one end of the fitting body for retaining the distal end of a length of tubing. As is detail hereinafter, clip 10 is insertable intermediate an external, forward end of the collet and the opposing end of the fitting body for preventing the accidental or otherwise unintentional release of the tubing end from the fitting.

In basic configuration, clip 10 may be seen to have a general "omega-shaped" geometry, and to include a retaining portion, 12, a shroud portion, 14, and, optionally, a handle portion, 16. Preferably, clip 10 is of an integral or unitary design which, depending upon its material of construction, may be fabricated by molding, forging, machining, or other conventional forming processes. Preferred materials of construction for clip 10 are broadly classified as "resilient" or otherwise those materials which exhibit flexural properties such as hysteresis or elastic deformation, i.e., spring or "snap-back," to accommodate the expansion of the clip such that it may be insertably received about the collet of the fitting. Such materials includes plastics and other polymeric materials, as well as ferrous or nonferrous metals such as mild steel, stainless steel, and brass. Preferred plastic materials include poly (ether ether ketones), polyimides, high molecular weight polyethylenes, polyetherimides, polybutylene terephthalates, nylons, fluoropolymers, polysulfones, polyesters, acetal homo and copolymers, and particularly polypropylenes. The selected metal or plastic material optionally may be annealed or otherwise heat or chemically treated to achieve the desired degree of resiliency.

Figure 2:
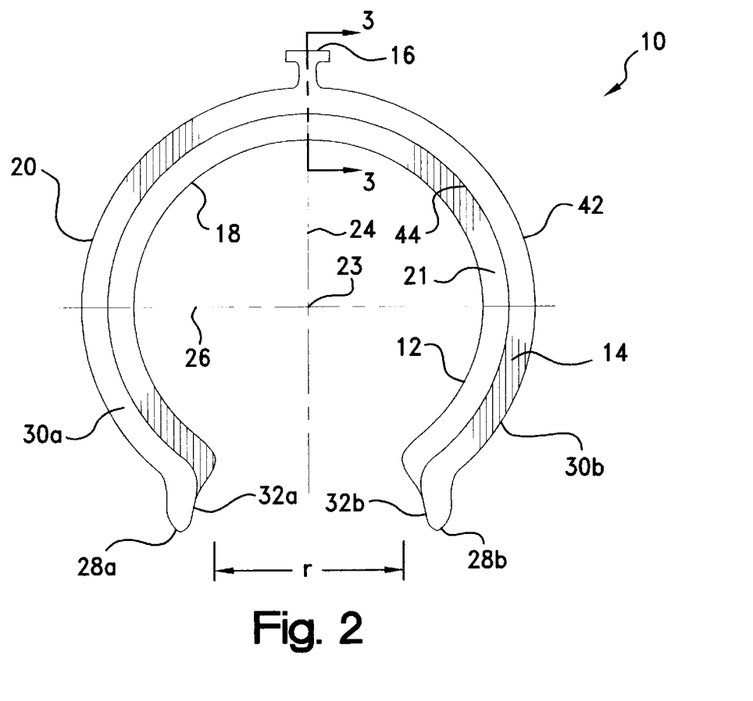
FIG. 2 is a front view of the clip of FIG. 1.
Figure 3:
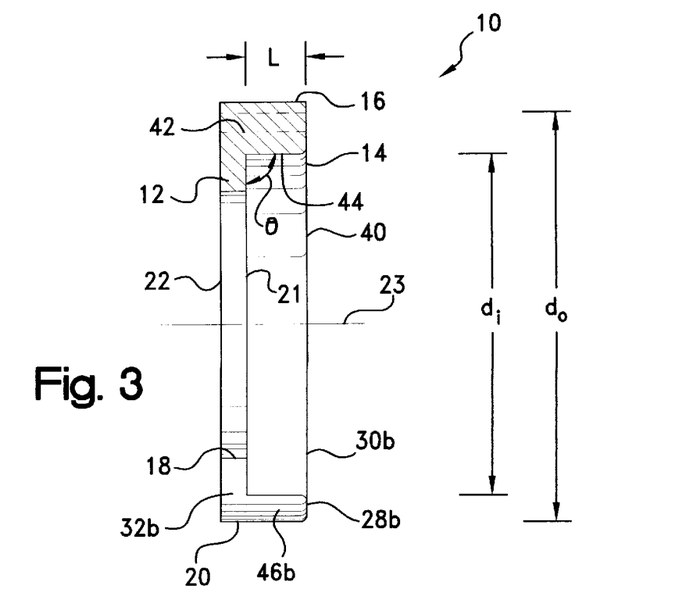
FIG. 3 is a cross-sectional view of the clip of FIG. 1 taken through line 3—3 of FIG. 2.

Looking additionally to the front view of FIG. 2 and the cross-sectional view of FIG. 3, retaining portion 12, which is configured to be insertably received coaxially on the fitting collet member intermediate the external end thereof and the opposing end of the fitting body member, may be seen to define the inner and outer peripheries, 18 and 20, of clip 10, with forward and rearward surfaces, 21 and 22 (FIG. 3), in turn, defined radially therebetween. In the preferred configuration shown, retaining portion 12 defines concentrically arcuate, i.e., semi-circular, inner and outer peripheries, 18 and 20, in extending radially about the central longitudinal axis, referenced at 23 in FIG. 3 and defined in FIG. 2 by the intersection of radial axes 24 and 26, from a first distal portion, 28a, to a second distal portion, 28b. Distal portions 28 are spaced-apart circumferentially to define a depending pair of cantilevered segments or legs, 30a and 30b. With clip 10 being formed of a resilient polymeric material or the like, segments 30 thereby are provided to be expansible radially outwardly for enlarging inner periphery 18 accommodating the insertion of retaining portion 12 intermediate the fitting collet and body member, and resiliently contractible radially inwardly for retaining said clip on the collet member.

That is, for a given outer diameter of the fitting collet member, inner periphery 18 is configured to define a normal or unexpanded inner diameter that is sized marginally larger, e.g., about 0.010 inch (0.25 mm), than the outer diameter of the fitting collet to allow the clip 10 to be freely journalled coaxially on the collet member. Distal portions 28, in turn, are spaced-apart to define an opening, referenced at "r" in FIG. 2, that normally is marginally smaller, e.g., about 50%, than the collet outer diameter for the retention of clip 10 thereon. However, for the insertion and removal of the clip, segments 30 are provided to be resiliently expansible to enlarge opening d such that the collet outer diameter is receivable therethrough, and then resilient contractible to return the opening d to its normal extent. To assist the expansion of segments 30, distal portions 28 may be configured, as is shown, to be divergently angled radially outwardly to present a pair of opposing camming surfaces, 32a–b. It will be appreciated that segments 30 thereby are made to be resiliently expansible responsive to the bearing of camming surfaces 32 on the outer diameter of the collet member.

As may be seen in FIGS. 1–3, shroud portion 14 is circumscribed about at least part of the outer periphery 20 of clip 10 as extending axially from the forward surface 21 of retaining portion 12 to a distal end, 40, determining a shroud length, referenced at "L" in FIG. 3. Preferably, and as is shown, shroud portion 14 is provided to extend generally circumferentially continuously about the clip outer periphery 20 to define a generally cylindrical member having an outer surface, 42, and inner surface, 44, for covering a major radial portion of the fitting collet member. That is, and as may be seen best in the cross-sectional view of FIG. 3, the inner surface 44 of shroud portion 14 defines a generally right angle, referenced at 0, with the forward surface 21 of retaining portion 12. Shroud portion 14 further preferably is configured, as is shown at 46a–b, to extend camming surfaces 28 further facilitating the insertion of clip 10 onto the outer diameter of the fitting collet member.

Handle portion 16, which extends radially outwardly from the outer periphery 20 of clip 10, may be configured as having a generally "T-shaped" cross-sectional geometry to be hand-graspable for easier installation and removal of the clip. In the illustrated embodiment, such clip portion 16 is provided to extend radially along the outer surface 42 of shroud portion 14 intermediate the distal end 40 thereof and the rearward surface 22 of retaining portion 12.

Figure 4:
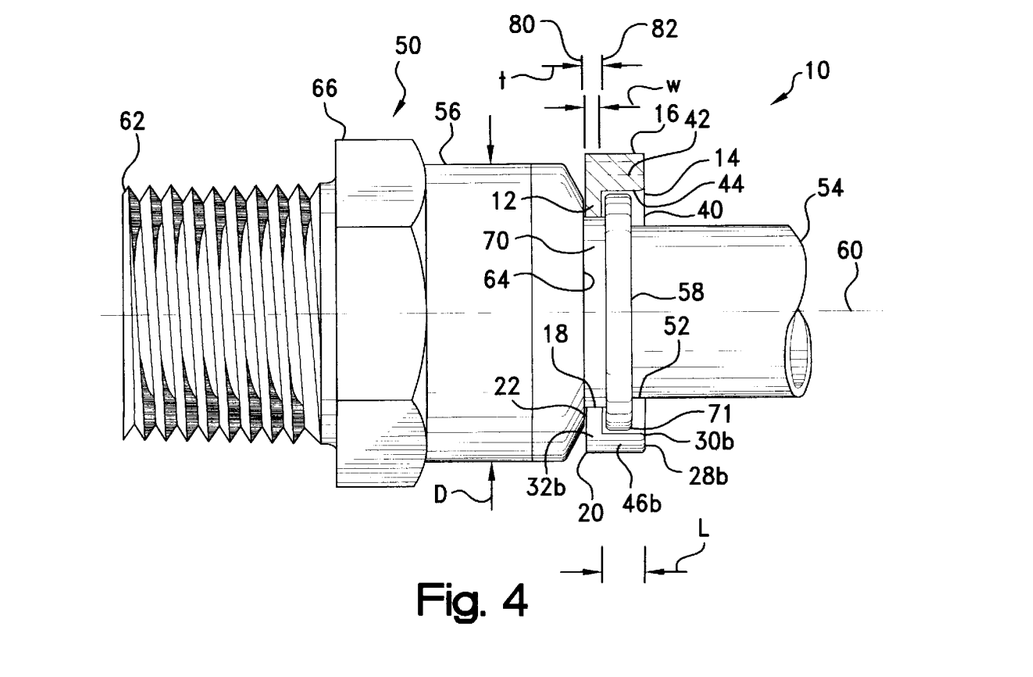
FIG. 4 is a partially cross-sectional assembly view of the clip of FIG. 1 as interposed between the collet and body members of a representative push-to-connect tube fitting of the type herein involved.

Turning next to the assembly view of FIG. 4, clip 10 of the present invention is shown as installed within a representative push-to-connect tube fitting, referenced generally at 50, effecting a fluid connection with the distal end, 52, of a length of tubing, 54, of a given outer diameter. In basic construction, and as may be better appreciated with additional reference to the cross-sectional view of FIGS. 5A and 5B, fitting 50 includes a generally tubular body member, 56, an annular, one-piece collet member, 58, journaled coaxially within body member 56, and an internal o-ring or other seal member, 59, interposed between the body and collet members 56 and 58.

Body member 56 extends axially along a central longitudinal axis, commonly referenced at 60 with clip axis 23 (FIG. 3), from a rearward first end, 62, to a forward second end, 64. For illustrative purposes, rearward first end 62 is shown to be configured as an externally-threaded nipple configured for engagement with, for example, the internally-threaded fastening member of an associated pipe fitting (not shown). In this regard, a radial flange, 66, configured as having hexagonal flat portions may be integrally formed about body member 56 intermediate the forward and rearward ends 62 and 64 thereof for engagement with a wrench or other tool during installation or connection. Other externally-threaded, as well as internally-threaded or unthreaded, embodiments of fitting rearward end 62 may be envisioned, however, depending on the desired configuration of fitting 50 as a coupling, connector, union, adapter, tee, elbow, cap, or the like.

Body member second end 64 opens to define an internal gland, 65, configured to receive collet member 58. Collet member 58, in turn, is integrally-formed as having a generally cylindrical wall portion, 70, of a given inner diameter. Wall portion 70 extends axially along central longitudinal axis 60 from between an external forward end or collar, 71, and a rearward internal end, 72, disposed within the body member. As is conventional, collet member 58 is divided into a plurality of arcuate segments, one of which is referenced at 73, for the resilient expansion of the inner diameter thereof to receive the distal end 52 of tubing 54 therethrough. Each of these segments, as is shown for segment 73, extends between a forward proximal end, 74, and a rearward distal end, 75, configured as having a radially inwardly extending, wedge-shaped projection or "grip edge," 76, and an outer surface or shoulder defining a bearing portion, 77, of an enlarged outer diameter for operative engagement with a corresponding internal camming surface, 78, of the fitting forward end. Each of the grip edges may be formed by the intersection of a forwardly and a rearwardly presenting inclined surface, 79a–b, respectively, the forward surface exhibiting a camming function with tubing distal end 52 effecting a radially outward expansion of collet member wall portion 70 for the insertion of tubing 54 therethrough. That is, collet member 58 may be resiliently enlarged by about 5–10% or more from its normal or relaxed inner diameter, to an expanded inner diameter accommodating, respectively, the insertion through the fitting body forward end 64 of tubing distal end 52 and the releasable capture thereof.

Figure 5A:
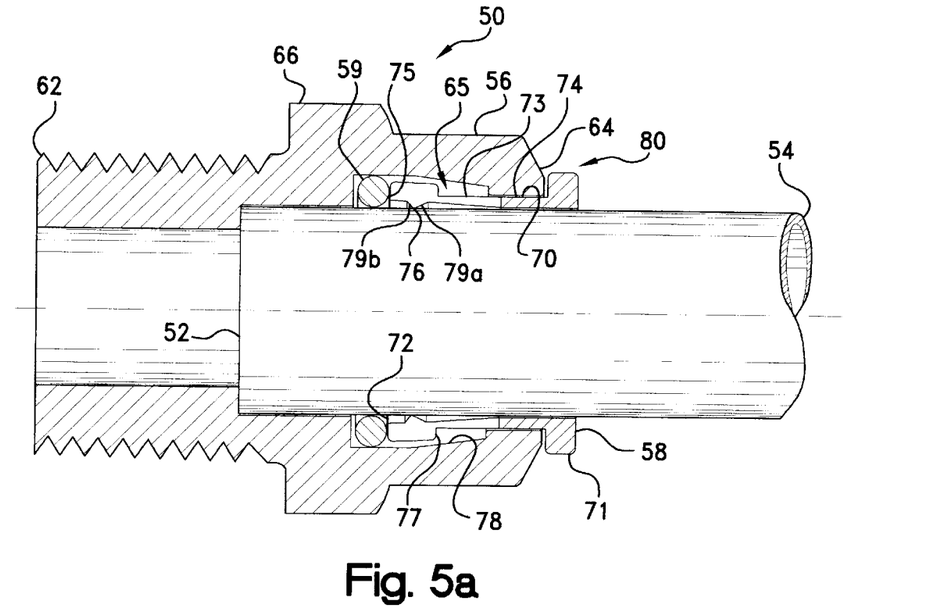
FIG. 5A is an operational cross-sectional view of the fitting of FIG. 4.
Figure 5B:
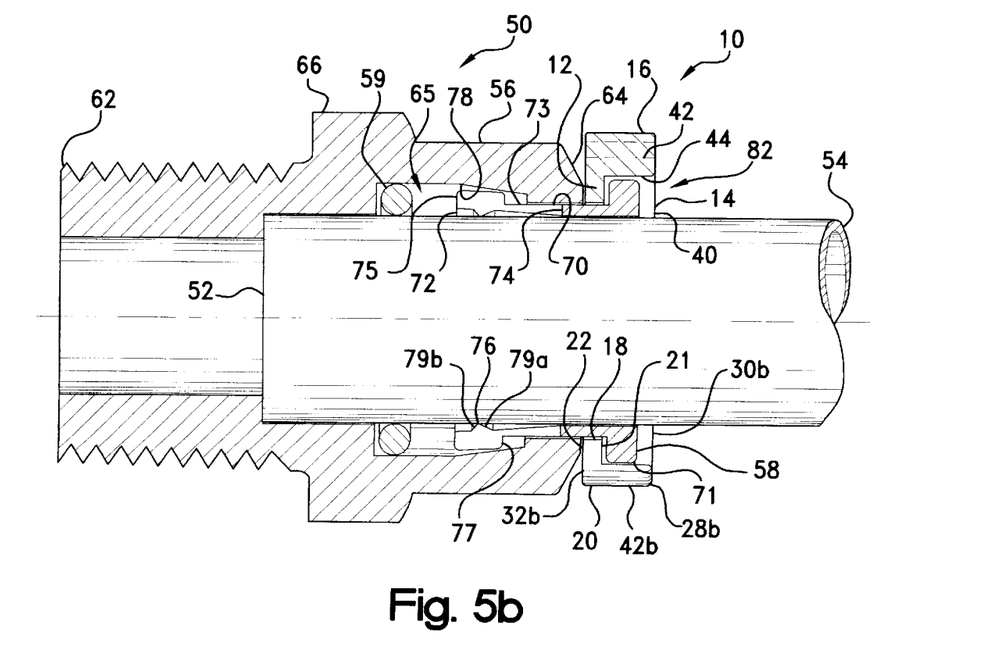
FIG. 5B is an cross-sectional view of showing the operation of the fitting of FIG. 5A with the clip of FIG. 1 installed.

Within the body member gland, the internal rearward end of collet member 58 is received for sliding axial movement along axis 60 for disposing collet member 58 at a rearward position, referenced at 80 and shown in FIG. 5A, wherein the collet forward end 71 may be abutted against the fitting body second end 64, and the forward position referenced at 82 and shown in FIGS. 4 and 5B which is spaced-apart axially from the rearward position 80 to define a collet travel or rise length, designated at "t," therebetween. In operation, considered initially as shown in FIG. 5A with clip 10 removed, collet member 58 may be advanced manually to its rearward position 80 wherein the internal rearward end 72 of the collet is positioned within the fitting body gland 65 accommodating the radial outward movement of the collet member segments 73 resiliently expanding collet wall portion 70 both for the insertable connection and for the removable disconnection of the tubing distal end 52. However, with collet member 58 advanced to the forward position 82, shown in FIG. 5B, responsive to the pressurization of tubing 54, or to the application of a forwardly-directed tensile force, the internal rearward end 72 of the collet is positioned within the fitting body gland 65 such that the bearing surface 77 of the collet segments 73 are urged into an abutting, force-transmitting engagement with the internal camming surface 78 of the fitting body member second end 64 transferring a radially inwardly directed normal force component to the collet member projections 76. Such force transfer energizes the collet member 58 by effecting the tightening of the "grip" or compression thereof about the outer diameter of the tubing 54 and the penetration of the collet segment projections thereinto. In this way, the removal of the tubing from the fitting body second end 54 is thereby delimited.

Considering next the operation of fitting 50 shown in FIGS. 4 and 5B with clip 10 installed, retaining portion 12 thereof is received coaxially on the fitting collet member 58 as inserted intermediate the external forward end 71 thereof and the opposing second end 64 of fitting body 56. With the forward and rearward surfaces 21 and 22 of retaining portion 12 disposed, respectively, opposite the collet member forward end 71 and the fitting body second end 64, shroud portion 14 is positioned to extend over the collet member forward end 71. In this regard, shroud length L is selected such that the shroud distal end 40 terminates beyond the forward end 71 of the collet member 58 when, as is shown in FIG. 4, the collet member is energized at is forward position 82. With shroud portion 14 provided to extend circumferentially continuously about the clip outer periphery 20 covering a major radial portion of the collet member 58, force-transmitting contact which would tend to move the collet member from its energized or other forward position to its de-energized rearward position is delimited. Thus, the release of the tubing from the fitting body is thereby controlled. Additionally, shroud portion 14 supports collet member 58 in delimiting its movement from torsional forces transmitted along the length of the tubing.

Preferably, shroud portion 14 extends axially such that the distal end 40 thereof terminates at least about ⅛-inch (3.2 mm) beyond the forward-most extent of the collet member, and radially such that the inner surface 44 thereof is spaced-apart about ¹⁄₆₄-inch (0.4 mm) from the outermost extent of the collet member to accommodate the sliding movement thereof along its travel length t. Advantageously, inner surface 44 may be sized to define an inner shroud diameter, referenced at "$d_i$" in FIG. 3, that is smaller than the outer diameter, referenced at "D" in FIG. 4, of the forward end 64 of fitting body member 56. In this way, and further with the shroud length L being sized to be greater than the collet travel t, the proper installation of clip 12 within fitting 56 is assured in that the clip thereby cannot be inserted backward with shroud portion 14 extending over the fitting body rather than the collet external end 71. With shroud outer surface 44 being sized to define an outer shroud diameter, referenced at "$d_o$" in FIG. 3, that is smaller or only marginally larger than the fitting diameter D, clip 10 may be provided in a compact arrangement which, unlike the covers heretofore known in the art, does not appreciable increase the size of the fitting assembly. Alternatively, with shroud inner diameter $d_i$ sized to be larger than the fitting outer diameter D, a second shroud portion 14 may be provided to extend rearwardly from clip 10 in a symmetrical arrangement.

Clip 10 of the present invention advantageously provides for a greater reliability of the fitting connection without having to energize the collet. That is, and as may be seen in FIG. 4, the forward and rearward surface of retaining portion 12 define an axial width, referenced at "w," therebetween. In further accordance with the precepts of the present invention, however, such width w is selected to be less than the collet travel length t. Accordingly, the interposition of clip retaining portion 12 between the fitting body and the collet may be effected without the advancement of the collet to its forward-most, energized position. Clip 10 therefore is adaptable for use with a variety of tubing materials and obviates the necessity to strictly control dimensional tolerances to ensure the energization of the collet.

Thus, a unique clip construction for use in combination with push-to-connect tube fittings is described which controls the accidental or otherwise unintentional disconnection of the tubing from the fitting. Such control advantageously is achieved in a compact arrangement without the need to energize the fitting collet.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A clip for use with a fitting of a variety adapted for a releasable connection with a distal tubing end of a given outer diameter, the fitting including a body member extending axially along a first central longitudinal axis to a forward end defining an internal gland, and a collet member journalled within the gland as extending axially along the first central longitudinal axis between an forward external end and a rearward internal end, the collet member being received for slidable movement within the gland intermediate a rearward position and a forward position space-apart axially from the rearward position to define a collet travel length therebetween, the rearward position accommodating the radial outward expansion of the collet member for the insertion and removal of the tubing end therethrough, and the forward position effecting the radially inward contraction of the collet member about the outer tubing diameter delimiting the removal of the tubing distal end from the fitting assembly, said clip comprising:

a retaining portion configured to be received coaxially on the collet member for insertion intermediate the external end thereof and the forward end of the fitting body member and defining an inner and an outer periphery of said clip, said retaining portion having a forward and a rearward surface each extending between said inner and outer periphery, and extending radially about a second central longitudinal axis from a first distal portion to a second distal portion spaced-apart circumferentially from said first distal portion to define a pair of cantilevered segments, said segments being expansible radially outwardly for enlarging the inner periphery of said retaining portion accommodating the insertion thereof intermediate the forward end of the collet member and the rearward end of the fitting body member, and being resiliently contractible radially inwardly for retaining said clip on the collet member; and a shroud portion configured to extend over the external end of the collet member for delimiting force-transmitting contact therewith tending to move the collet member from its forward to rearward position, said shroud portion being circumscribed about at least part of the outer periphery of said clip as extending axially from the forward surface of said retaining portion to a distal end defining a length of said shroud portion selected such that when said retaining portion of said clip is received on the collet member with the forward surface of said retaining portion disposed opposite the external end of the collet member and with the rearward surface of said retaining portion disposed opposite the forward end of the fitting body member, the distal end of said shroud portion terminates beyond the external end of the collet member when the collet member is disposed in its forward position.

2. The clip of claim 1 wherein said shroud portion extends generally circumferentially continuously about the outer periphery of said clip.

3. The clip of claim 1 wherein said retaining portion defines a generally arcuate inner and outer periphery extending concentrically radially about said second central longitudinal axis.

4. The clip of claim 1 wherein said first and said second distal portion are each angled radially outwardly to present a pair of opposing camming surfaces, said segments being expansible responsive to the bearing of said camming surfaces on the collet member.

5. The clip of claim 1 wherein said shroud portion extends generally circumferentially continuously about the outer periphery of said clip to define a generally cylindrical member covering a major radial portion of the collet member.

6. The clip of claim 1 wherein said shroud portion extends over said collet member a spaced-apart radial distance therefrom.

7. The clip of claim 1 wherein said shroud portion presents an inner radial surface about the collet member, said inner radial surface defining a generally right angle with the forward surface of said retaining portion.

8. The clip of claim 1 wherein the forward and the rearward surface of said retaining portion define an axial width therebetween, said width being less than the travel length of the fitting collet member.

9. The clip of claim 1 wherein the length of said shroud portion is further selected to be longer than the collet travel length.

10. A fitting assembly of a variety adapted for a releasable connection with a distal tubing end of a given outer diameter, said assembly comprising:

a body member extending axially along a central longitudinal to a forward end defining an internal gland;

a collet member journalled within the gland as extending axially along said central longitudinal axis between an forward external end and a rearward internal end, the collet member being received for slidable axial movement within the gland intermediate a rearward position and a forward position spaced-apart axially from the rearward position to define a collet travel length therebetween, the rearward position accommodating the radial outward expansion of the collet member for the insertion and removal of the tubing end therethrough, and the forward position effecting the radially inward contraction of the collet member about the outer tubing diameter delimiting the removal of the tubing distal end from the fitting assembly; and a clip including a retaining portion defining an inner and an outer periphery of said clip and received coaxially on the collet member intermediate the external end thereof and the forward end of the fitting body member, and a shroud portion extending over the external end of the collet member for delimiting force-transmitting contact therewith tending to move the collet member from its forward to rearward position, said retaining portion having a forward surface disposed opposite the external end of the collet member and a rearward surface disposed opposite the forward end of the fitting body member, each said forward and said rearward surface extending between said inner and outer periphery, and said retaining portion extending radially about said central longitudinal axis from a first distal portion to a second distal portion spaced-apart circumferentially from said first distal portion to define a pair of cantilevered segments, said segments being expansible radially outwardly for enlarging the inner periphery of said retaining portion accommodating the insertion thereof intermediate the forward end of the collet member and the rearward end of the fitting body member, and being resiliently contractible radially inwardly for retaining said clip on the collet member, and said shroud portion being circumscribed about at least part of the outer periphery of said clip as extending axially from the forward surface of said retaining portion to a distal end defining a length of said shroud portion selected such that when the collet member is disposed in its forward position the distal end of said shroud portion terminates beyond the external end of the collet member.

11. The assembly of claim 10 wherein said shroud portion of said clip extends generally circumferentially continuously about the outer periphery of said clip.

12. The assembly of claim 10 wherein said retaining portion defines a generally arcuate inner and outer periphery extending concentrically radially about said central longitudinal axis.

13. The assembly of claim 10 wherein said first and said second distal portion are each angled radially outwardly to present a pair of opposing camming surfaces, said segments being expansible responsive to the bearing of said camming surfaces on the collet member.

14. The assembly of claim 10 wherein said shroud portion of said clip extends generally circumferentially continuously about the outer periphery of said clip to define a generally cylindrical member covering a major radial portion of the collet member.

15. The assembly of claim 10 wherein said shroud portion of said clip extends over said collet member a spaced-apart radial distance therefrom.

16. The assembly of claim 10 wherein said shroud portion of said clip presents an inner radial surface about the collet member, said inner radial surface defining a generally right angle with the forward surface of said retaining portion.

17. The assembly of claim 10 wherein the forward and the rearward surface of said retaining portion of said clip define an axial width therebetween, said width being less than the travel length of the fitting collet member.

18. The assembly of claim 10 wherein the length of said shroud portion of said clip is further selected to be longer than the travel length of said collet member.

19. A clip for use with a fitting of a variety adapted for a releasable connection with a distal tubing end of a given outer diameter, the fitting including a body member extending axially along a first central longitudinal axis to a forward end defining an internal gland, and a collet member journalled within the gland as extending axially along the first central longitudinal axis between an forward external end and a rearward internal end, the collet member being received for slidable movement within the gland intermediate a rearward position and a forward position space-apart axially from the rearward position to define a collet travel length therebetween, the rearward position accommodating the radial outward expansion of the collet member for the insertion and removal of the tubing end therethrough, and the forward position effecting the radially inward contraction of the collet member about the outer tubing diameter delimiting the removal of the tubing distal end from the fitting assembly, said clip comprising:

a retaining portion configured to be received coaxially on the collet member for insertion intermediate the external end thereof and the forward end of the fitting body member, said retaining portion defining an inner and an outer periphery of said clip, and having a forward and a rearward surface each extending between said inner and outer periphery;

a shroud portion configured to extend over the external end of the collet member for delimiting force-transmitting contact therewith tending to move the collet member from its forward to rearward position, said shroud portion being circumscribed about at least part of the outer periphery of said clip as extending axially from the forward surface of said retaining portion to a distal end defining a length of said shroud portion selected such that when said retaining portion of said clip is received on the collet member with the forward surface of said retaining portion disposed opposite the external end of the collet member and with the rearward surface of said retaining portion disposed opposite the forward end of the fitting body member, the distal end of said shroud portion terminates beyond the external end of the collet member when the collet member is disposed in its forward position; and a hand-graspable handle portion extending radially outwardly from the outer periphery of said clip.

20. A fitting assembly of a variety adapted for a releasable connection with a distal tubing end of a given outer diameter, said assembly comprising:

a body member extending axially along a central longitudinal to a forward end defining an internal gland;

a collet member journalled within the gland as extending axially along said central longitudinal axis between an forward external end and a rearward internal end, the collet member being received for slidable axial movement within the gland intermediate a rearward position and a forward position spaced-apart axially from the rearward position to define a collet travel length therebetween, the rearward position accommodating the radial outward expansion of the collet member for the insertion and removal of the tubing end therethrough, and the forward position effecting the radially inward contraction of the collet member about the outer tubing diameter delimiting the removal of the tubing distal end from the fitting assembly;

a clip including a retaining portion received coaxially on the collet member intermediate the external end thereof and the forward end of the fitting body member, and a shroud portion extending over the external end of the collet member for delimiting force-transmitting contact therewith tending to move the collet member from its forward to rearward position, said retaining portion defining an inner and an outer periphery of said clip, and having a forward surface disposed opposite the external end of the collet member and a rearward surface disposed opposite the forward end of the fitting body member, each said forward and said rearward surface extending between said inner and outer periphery, and said shroud portion being circumscribed about at least part of the outer periphery of said clip as extending axially from the forward surface of said retaining portion to a distal end defining a length of said shroud portion selected such that when the collet member is disposed in its forward position the distal end of said shroud portion terminates beyond the external end of the collet member; and a hand-graspable handle portion extending radially outwardly from the outer periphery of said clip.

\* \* \* \* \*